(12) United States Patent
Glass

(10) Patent No.: US 7,185,769 B2
(45) Date of Patent: Mar. 6, 2007

(54) ARTICLE STORAGE DISPLAY TOWER

(76) Inventor: Timothy Glass, 1200 S. Federal #F, Chicago, IL (US) 60005

( * ) Notice: Subject to any disclaimer, the term of this patent is extended or adjusted under 35 U.S.C. 154(b) by 0 days.

(21) Appl. No.: 09/910,516

(22) Filed: Jul. 20, 2001

(65) Prior Publication Data

US 2003/0015484 A1    Jan. 23, 2003

(51) Int. Cl.
*A47G 29/00* (2006.01)

(52) U.S. Cl. .............................. 211/40; 211/78; 211/163

(58) Field of Classification Search ................. 211/40, 211/41.12, 163, 70, 78, 95; 312/249.2, 249.6, 312/9.46, 125, 135
See application file for complete search history.

(56) References Cited

U.S. PATENT DOCUMENTS

| | | | | |
|---|---|---|---|---|
| 2,738,075 A * | 3/1956 | Guignard et al. | ........... | 211/163 |
| 3,337,059 A * | 8/1967 | LeHoy | ........... | 211/40 |
| 3,844,230 A | 10/1974 | Hudson et al. | | |
| 3,855,943 A * | 12/1974 | Larson | ........... | 108/28 |
| 3,938,665 A * | 2/1976 | Rumble | ........... | 211/163 |
| 3,997,050 A * | 12/1976 | Patterson | ........... | 211/163 |
| 4,030,608 A * | 6/1977 | Howard | ........... | 211/131.1 |
| 4,140,223 A * | 2/1979 | Rau et al. | ........... | 211/78 |
| 4,367,000 A * | 1/1983 | Sparks et al. | ........... | 312/351 |
| D316,643 S | 5/1991 | Cheetham | | |
| 5,033,626 A * | 7/1991 | Platti | ........... | 211/37 |
| 5,253,767 A | 10/1993 | Koeppel | | |
| 5,259,515 A | 11/1993 | Koeppel | | |
| 5,280,840 A * | 1/1994 | Terpening | ........... | 211/165 |
| D358,279 S | 5/1995 | Ackley et al. | | |
| 5,415,296 A | 5/1995 | Wright | | |
| D364,066 S * | 11/1995 | Haskett et al. | ........... | D6/407 |
| 5,485,926 A | 1/1996 | Kundert | | |
| 5,551,577 A | 9/1996 | Hagopian | | |
| 5,568,873 A * | 10/1996 | Gioscia | ........... | 211/163 |
| 5,690,399 A | 11/1997 | Davis | | |
| 5,769,244 A | 6/1998 | Wyatt | | |
| 5,772,055 A * | 6/1998 | Orr et al. | ........... | 211/41.12 |
| 5,853,090 A * | 12/1998 | Brozak, Jr. | ........... | 211/13.1 |
| 5,971,169 A * | 10/1999 | Orr et al. | ........... | 211/163 |
| 6,508,021 B2 * | 1/2003 | Ong | ........... | 211/163 |
| 6,585,119 B2 * | 7/2003 | Palder | ........... | 211/49.1 |
| 2003/0038097 A1* | 2/2003 | Palder | ........... | 211/49.1 |
| 2003/0173321 A1* | 9/2003 | Craft et al. | ........... | 211/144 |

* cited by examiner

*Primary Examiner*—Jennifer E. Novosad
(74) *Attorney, Agent, or Firm*—Timothy Glass

(57) ABSTRACT

An article storage display tower for storage, display and continuous easy access to the article is provided. The display tower has a top and a bottom with a cell structure having a plurality of cells positioned between the top and the bottom. Each of the cells of the tower can store and display a plurality of articles, such as compact discs, while allowing access to the articles. The cell structure is rotatably connected to a base that permits the cell structure to rotate about an axis perpendicular to the base, so that access to all cells is facilitated.

4 Claims, 1 Drawing Sheet

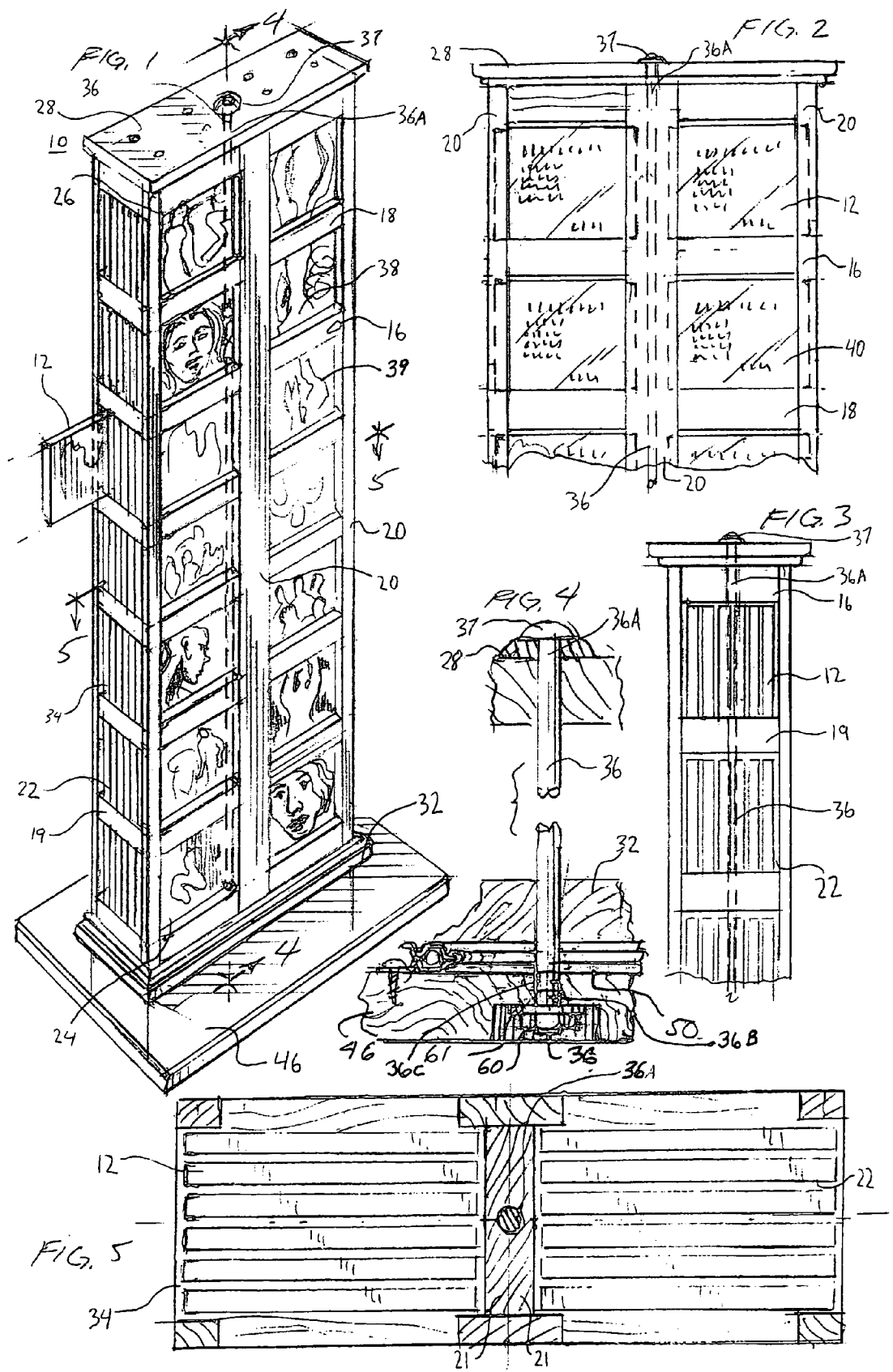

ARTICLE STORAGE DISPLAY TOWER

FIELD OF THE INVENTION

The present invention relates to article storage display towers, and more particularly to article storage display towers that provide for storage, organization and viewing of audio and/or video storage media.

BACKGROUND OF THE INVENTION

Compact storage devices of various types are known in the art. Such devices are typically used by consumers to hold their audio and video disks in a safe and orderly manner. A constant challenge for consumers is the effective organization of their audio and video disks. A storage device for audio and video disks is typically used in a home near the home's central living area. The storage device should be attractive in appearance, easy to use, decorative, compact, durable and affordable.

Previous storage devices have some inherent disadvantages. One of the disadvantages with existing disk storage devices is that they do not allow for easy viewing of both the front and back covers of audio and video disks when the disks are in the storage unit. Further, existing storage devices do not display the disk's title, song titles, and artist information in an easy to view manner.

The present invention overcomes these and other problems inherent in existing audio and video disk storage devices. The present invention provides an article storage display tower for storage, organization and viewing of audio and/or video disks that holds disks so as to allow the user to view the front and back of selected disk covers. To achieve this, the present invention contains a plurality of cells that can accept, for example, compact disks or other media storage articles, such as for example, mini disks, video cassettes, audio cassettes, CD ROM's, digital video disks, etc. The storage display tower structure rests on a swivel base so that users can rotate the structure and display the decorative front cover as well as the back cover of select compact disks or other audio and/or video storage media. The invention, therefore, not only stores compact disks but the invention can be displayed as a piece of artwork.

The principal object of the present invention is to provide an improved article storage display tower that can store a plurality of audio and/or video storage media.

Another object of the present invention is to provide an improved article storage display tower that can display substantially the entire front and back surfaces of audio and/or video storage media.

Another object of the present invention is to provide a novel article storage display tower that can rotate.

Still another object of the present invention is to provide a novel article storage display tower that allows a user to arrange audio and/or visual storage media to display the graphics on the front and/or back of the storage media in a unique or aesthetic manner.

A further object of the present invention is to provide a novel article storage display tower that is free standing.

A further object of the present invention is to provide a novel article storage display tower that provides for visually appealing storage of audio and/or video storage media.

A further object of the present invention is to provide a novel article storage system that provides for easy accessibility of audio and/or video storage media.

A further object of the present invention is to provide a novel article storage display tower which is simple in design and inexpensive to construct, and is durable and rugged in structure.

Still further objects and advantages will become apparent from a consideration of the ensuing description and drawings of the invention.

These and other objects are achieved by an article storage display tower of the present invention. In one form of the invention, an article storage display tower is provided which provides an article storage display for audio or visual storage media that allows the front and back surfaces of the articles to be displayed by the user in a visually selected manner. Further, the storage display tower can be rotated about a stationary base to allow for easy selection and viewing of the stored articles. Also, the articles are easily placed in, removed from and arranged in the storage display. The storage display along with the stored articles can be positioned in a room as a piece of artwork.

SUMMARY OF THE INVENTION

These and other objects are achieved by an article storage display tower of the present invention. In one form of the invention, an article storage display tower is provided that has a top and a bottom with a cell structure having a plurality of cells positioned between the top and bottom. Each cell being capable of storing and displaying a plurality of articles, such as compact disks. The cell structure is rotatably connected to a base which is provided for the cell structure to rotate about an axis perpendicular to the base.

BRIEF DESCRIPTION OF THE DRAWINGS

FIG. 1 is a perspective view of one embodiment of the article storage display tower of the present invention showing articles located in the storage display;

FIG. 2 is a partial view of top portion the back surface of the article storage display tower of FIG. 1;

FIG. 3 is a partial view of the side portion of the article storage display tower of FIG. 1;

FIG. 4 is a cross sectional view of the article storage display tower of FIG. 1 along line 4—4; and FIG. 5 is a cross sectional view of the article storage display tower of FIG. 1 along line 5—5.

DETAILED DESCRIPTION OF THE INVENTION

FIG. 1 is a perspective view of one embodiment of the article storage display tower 10 constructed in accordance with the present invention. In FIG. 1, the article storage display tower 10 comprises a storage display structure 16, a shaft 36, a knob 37, a base 46 and connector assembly (not shown).

As best shown in FIGS. 1, 2 and 5, the storage display structure 16 may comprise outer horizontal members 18, inner horizontal members 19, outer vertical members 20, inner vertical members 21, cells 22, cell side open end 34, cell front opening 39, cell rear opening 40, a top 28 and a bottom 32. Also, as shown in FIGS. 1, 2, 3 and 5, are articles (i.e., compact disks) 12 placed in the storage display structure cells 22.

In one embodiment, the display structure 16 may be formed by providing and joining, substantially as shown in FIGS. 1, 2 and 5, outer horizontal members 18, inner horizontal members 19, outer vertical members 20, inner vertical member 21 thereby forming cells 22. Cells 22 may be sized to allow the particular audio and/or video media to be removably stored within the cells 22. In this regard, cells 22 may be any dimensions required for particular media. Each cell 22 may be sized to hold one or more audio and/or video storage media. In one embodiment, as shown in FIG. 3 for example, each cell 22 may be sized to hold six compact disks. Members 18, 19, 20 and 21 may be joined to each respective member by, for example, nails, screws, dowels and/or glue or any other type of fastening means that will provide for proper operation of storage display tower 10. The storage display structure 16 may be constructed of wood, metal, and/or plastic or any other type of material(s) that will provide for proper operation of the article storage display 10.

In other embodiments, top 28 and/or bottom 32 may be attached to structure 16. Top 28 and/or bottom 32 may be joined to structure 16 by, for example, nails, screws, dowels and/or glue or any other type of fastening means that will provide for proper operation of storage display tower 10. Top 28 and/or bottom 32 may be constructed of wood, metal, and/or plastic or any other type of material(s) that will provide for proper operation of article storage display 10.

Shaft 36 may be located along the central axis of display structure 16 whereby shaft end 36A passes through top 28 and shaft end 36B passes through bottom 32 substantially as shown in FIGS. 2, 4 and 5. Shaft 36 may be positioned within storage display 16 so as to allow display 16 to freely rotate about shaft 36 in a clockwise and/or counter clockwise direction with respect to shaft 36. Shaft end 36B may contain threads 36C, as shown in FIG. 4 and may extend through base 46. Fastener 55 which may comprise a nut 60 and a washer 61, for example, may maintain shaft 36 in a fixed position with respect to base 46 while allowing storage display structure 16 to rotate about shaft 36. The base 46 may be constructed of wood, metal, and/or plastic or any other type of material(s) that will provide for proper operation of the storage display tower 10. The shaft 36 may be constructed of wood, metal, and/or plastic or any other type of material(s) that will provide for proper operation of the storage display tower 10. In yet other embodiments, storage display tower 10 may be constructed without shaft 36 and connector assembly 50 so as to provide a display 10 that does not swivel about base 46.

Knob 37 may be fixed to top 28 so that when knob 37 is rotated by a user, the storage display structure 16 is rotated about shaft 36. In other embodiments, knob 37 may be fixed to shaft 36 whereby when the storage display structure 16 is rotated about shaft 36, the knob 37 does not rotate.

In one embodiment, as shown in FIG. 4, connector assembly 50 may comprise a device commonly refereed to as a turn table or lazy susan, for example, as sold by Shepherd® Hardware Products of Ontario, Canada. In one embodiment, one side of connector assembly 50 would be mounted to bottom 32 the opposite side of a connector assembly would be mounted to base 46 substantially as shown in FIG. 4. The connector assembly may be, for example, 3", 4", 5" or 6" in diameter or may be any other size required for proper operation of the article storage display 10.

In alternate embodiments, the storage display structure 16 may be adapted to store and display articles such as, for example, digital video disks (DVDs), mini-disks, audio cassettes, video cassette tapes, book or virtually any other type of article that stores audio, video and/or text information.

As shown in FIG. 1, in one embodiment, storage display structure 16 may be comprised of seven rows 24 of cells 22. In yet other embodiments, storage display structure 16 may be comprised of one or more rows of cells 22.

In use, a user may place audio and/or video storage media into the article storage display. For example, if the user wants to store her compact disks, the user would place her compact disks through cell open end 34 until the compact disk was securely positioned inside cell 22. The user may arrange the compact disks in any order she requires. For example, the compact disks may be arranged alphabetized by artist's last name as viewed through the cell open end 34. The user may also choose to arrange the compact disks to create a visually appealing display. In this instance, the user would arrange the disks by viewing the disk front covers through the cell front opening 38 and/or the cell rear opening 40. The user may also decide to display only the disk back covers for viewing through the cell front and rear openings 38 and 40 respectively. To select a compact disk, the user may view the front covers, rear cover or disk side cover and easily remove the disk from cell 22.

Specific embodiments of novel methods and apparatus for construction of novel article storage display towers according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A tower for the storage, display and unimpeded accessibility of compact disks housed within their storage container having front and back covers, said tower comprising:
    a rigid elongated-unitary cell structure having a top, a bottom and a plurality of horizontal and vertical members positions between the top and the bottom to form a plurality of cells, each cell having two openings disposed opposite each other, whereby each opening has a width and height dimension that defines the size of each opening to enable viewing of an entire compact disk storage container cover, the cells are configured and positioned adjacent each other so that when the compact disk housed within their containers are stored in the cells, one compact disk cover is visible in each opening;
    each of the cells being sized to receive, hold and display at least one compact disk housed within its storage container, the cells comprising a third opening of sufficient size to permit the unimpeded placement and removal of the compact disks housed within their storage containers;
    the cell structure further forming a passage that extends through the length of the cell structure;
    a base having a rotatable connector assembly fixed to the base; and
    a shaft having one end fixed to the base and passing through the cell structure passage whereby the shaft is rotatably connected to the cell structure and the cell structure is connected to the rotatable connector assembly to provide for the cell structure to rotate with respect to the base.

2. The tower of claim 1 further comprising a knob connected to the top whereby turning the knob rotates the cell structure.

3. The tower of claim 1 wherein the shaft has a threaded end located proximate the base and a connecting assembly is attached to the threaded end to maintain the shaft fixed to the base.

4. The tower of claim 1 further comprising a connector assembly mounted to the base and rotatably connected to the cell structure.

* * * * *